United States Patent
Jiang

(10) Patent No.: US 12,108,456 B2
(45) Date of Patent: Oct. 1, 2024

(54) INFORMATION REPORTING METHOD AND APPARATUS, AND TERMINAL AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/266,405

(22) PCT Filed: Aug. 7, 2018

(86) PCT No.: PCT/CN2018/099249
§ 371 (c)(1),
(2) Date: Feb. 5, 2021

(87) PCT Pub. No.: WO2020/029092
PCT Pub. Date: Feb. 13, 2020

(65) Prior Publication Data
US 2021/0315020 A1    Oct. 7, 2021

(51) Int. Cl.
*H04W 74/0833* (2024.01)
*H04B 7/08* (2006.01)
(Continued)

(52) U.S. Cl.
CPC ........ *H04W 74/0833* (2013.01); *H04B 7/088* (2013.01); *H04W 28/0284* (2013.01);
(Continued)

(58) Field of Classification Search
CPC ......... H04W 74/0833; H04W 28/0289; H04W 56/001; H04W 72/02; H04W 72/046;
(Continued)

(56) References Cited

U.S. PATENT DOCUMENTS

2014/0120926 A1   5/2014   Shin et al.
2015/0271700 A1*   9/2015   Lee ............... H04W 28/0263
                                                     370/230

(Continued)

FOREIGN PATENT DOCUMENTS

CN          106341170 A     1/2017
WO    WO-2016086144 A1 *   6/2016          H04B 7/0617

OTHER PUBLICATIONS

Extended European Search Report issued Feb. 18, 2022 in European Patent Application No. 18929551.2, 9 pages.
(Continued)

*Primary Examiner* — Harry H Kim
*Assistant Examiner* — Mohammed M Murshid
(74) *Attorney, Agent, or Firm* — Oblon, McClelland, Maier & Neustadt, L.L.P.

(57) ABSTRACT

Aspects of the disclosure provide an information reporting method and apparatus, and a terminal and a storage medium, belonging to the technical field of communications. The method can include, during random access, a terminal selecting a downlink beam, the terminal using a random access resource associated with the downlink beam to send a random access request to an access network device. Further, the method can include the terminal sending to a network identification information of the downlink beam selected during the random access procedure. According to the embodiments of the disclosure, by means of reporting to a network identification information of a downlink beam selected by a terminal during random access and then determining whether the terminal has selected all downlink beams suitable for selection, the network accurately positions the reasons for the problems of the terminal during the random access procedure, thereby creating the correct solution.

14 Claims, 2 Drawing Sheets

(51) Int. Cl.
   *H04W 28/02* (2009.01)
   *H04W 56/00* (2009.01)
   *H04W 72/02* (2009.01)
   *H04W 72/044* (2023.01)
   *H04W 74/00* (2009.01)
   *H04W 76/19* (2018.01)

(52) U.S. Cl.
   CPC ......... *H04W 56/001* (2013.01); *H04W 72/02* (2013.01); *H04W 72/046* (2013.01); *H04W 74/006* (2013.01); *H04W 76/19* (2018.02)

(58) Field of Classification Search
   CPC ... H04W 74/006; H04W 76/19; H04W 16/28; H04W 74/004; H04B 7/088; H04B 7/0695
   See application file for complete search history.

(56) References Cited

U.S. PATENT DOCUMENTS

| | | | | |
|---|---|---|---|---|
| 2015/0334637 A1* | 11/2015 | Kim | ...................... | H04W 48/12 370/312 |
| 2017/0207843 A1 | 7/2017 | Jung et al. | | |
| 2017/0346535 A1 | 11/2017 | Islam et al. | | |
| 2017/0346539 A1* | 11/2017 | Islam | ................... | H04B 7/0408 |
| 2018/0042000 A1* | 2/2018 | Zhang | ................... | H04W 72/23 |
| 2018/0049245 A1* | 2/2018 | Islam | ..................... | H04B 7/088 |
| 2018/0227899 A1* | 8/2018 | Yu | ......................... | H04W 74/08 |
| 2019/0110242 A1* | 4/2019 | Islam | .................. | H04W 74/006 |
| 2019/0116605 A1* | 4/2019 | Luo | .................. | H04W 72/0446 |
| 2019/0341986 A1* | 11/2019 | Raghavan | .......... | H04B 7/15514 |
| 2020/0015273 A1* | 1/2020 | Zhang | .................. | H04W 74/02 |
| 2020/0322031 A1* | 10/2020 | You | ......................... | H04L 5/001 |
| 2020/0328795 A1* | 10/2020 | Hao | ..................... | H04W 16/28 |
| 2021/0083746 A1* | 3/2021 | Huang | ..................... | H04L 1/00 |

OTHER PUBLICATIONS

Samsung, "RA procedure with and without beam correspondence", 7.1.2.5, 3GPP TSG RAN WG1 #87 Reno, USA Nov. 14-18, 2016, R1-161466, Nov. 13, 2016, XP051176414, 5 pages.

International Search Report issued May 7, 2019 in PCT/CN2018/099249 filed Aug. 7, 2018, 2 pages.

European Office Action issued on Mar. 6, 2023 in European Patent Application No. 18 929 551.2, 6 pages.

* cited by examiner

INFORMATION REPORTING METHOD AND APPARATUS, AND TERMINAL AND STORAGE MEDIUM

CROSS-REFERENCE TO RELATED APPLICATION

This application is a U.S. national phase of International Application No. PCT/CN2018/099249, filed on Aug. 7, 2018, the entire content of which is incorporated herein by reference.

TECHNICAL FIELD

The present disclosure relates to a field of communication technologies, including to an information reporting method, an apparatus, a terminal and a storage medium.

BACKGROUND

In a 5G system, also known as a New Radio (NR) system, a beam is introduced for data transmission. During a random access procedure, a terminal may select a downlink beam to enable an access network device to subsequently use the downlink beam to send information to the terminal.

During the random access procedure, the terminal may preferentially select a downlink beam with high signal quality, and use random access resources associated with the selected downlink beam to send a random access request to an access network device. If the terminal does not receive a response message fed back by the access network device due to congestion in the downlink beam, the terminal may reselect a downlink beam and resend a random access request. If the terminal does not complete the random access procedure until a relevant timer expires, the terminal determines that the random access procedure is unsuccessfully completed. However, in the above, the network cannot know causes of the unsuccessfully completed random access procedure.

SUMMARY

Embodiments of the present disclosure provide an information reporting method, an apparatus, a terminal and a storage medium, so that the network can determine causes of an unsuccessfully completed random access procedure.

According to a first aspect of the disclosure, an information reporting method is provided. The method can include selecting a downlink beam by a terminal during a random access procedure, in which the downlink beam is a beam configured to send information to the terminal by an access network device in a network. The method can further include sending, by the terminal, a random access request to the access network device by using a random access resource associated with the downlink beam, and sending, by the terminal, identification information of the downlink beam selected during the random access procedure to the network.

Alternatively, the identification information of the downlink beam can include a SSB (synchronization signal and physical broadcast channel (PBCH) block) index corresponding to the downlink beam. Further, the identification information of the downlink beam can be sent to the network in response to an unsuccessfully completed random access procedure. Additionally, the random access procedure is triggered and executed in any scenario of: a connection establishment scenario, a connection recovery scenario, a beam failure recovery (BFR) scenario, a radio link failure (RLF) scenario, and a connection reestablishment scenario.

The method can further include recording, by the terminal, a congestion situation of the downlink beam selected during the random access procedure, and sending, by the terminal, the congestion situation to the network. Alternatively, recording the congestion situation of the downlink beam selected during the random access procedure can include recording, by the terminal, congestion indication information corresponding to identification information of an $i^{th}$ downlink beam, in which the congestion indication information is configured to indicate whether congestion exists in the $i^{th}$ downlink beam, and i is a positive integer. Further, recording the congestion situation of the downlink beam selected during the random access procedure can include recording, by the terminal, first information, the first information configured to indicate that all downlink beams selected by the terminal during the random access procedure are congested: or, recording, by the terminal, second information, the second information configured to indicate that at least one downlink beam selected by the terminal during the random access procedure is uncongested.

The method can further include recording, by the terminal, signal quality of at least one downlink beam for being selected by the terminal during the random access procedure, in which, the at least one downlink beam is in a cell to which the terminal belongs, and sending, by the terminal, the recorded signal quality to the network. Recording the signal quality of the at least one downlink beam for being selected by the terminal during the random access procedure can include recording, by the terminal, the signal quality of the downlink beam selected during the random access procedure.

Alternatively, a total number of downlink beams selected by the terminal during the random access procedure is n, where n is a positive integer. Recording, by the terminal, the signal quality of the at least one downlink beam for being selected by the terminal during the random access procedure includes, in response to determining that n is less than or equal to a preset threshold t, recording, by the terminal, signal quality of the n downlink beams: and in response to determining that n is greater than the preset threshold t, recording, by the terminal, signal quality of t downlink beams in the n downlink beams.

Alternatively, the method can further include in response to determining that determining that n is less than the preset threshold t, recording, by the terminal, signal quality of m downlink beams, in which the m downlink beams are first m downlink beams selected from downlink beams sorted based on signal quality in descending order, the downlink beams are not selected by the terminal during the random access procedure, and m is a positive integer. Additionally, the method can further include recording, by the terminal, a number of times of transmitting a preamble corresponding to at least one downlink beam selected during the random access procedure: and sending, by the terminal, the recorded number of times of transmitting the preamble to the network.

According to a second aspect of the disclosure, an information reporting apparatus is provided that is applied to a terminal. The apparatus can include a beam selecting module, a request sending module, and an information reporting module. The beam selecting module is configured to select a downlink beam during a random access procedure, in which the downlink beam is a beam configured to send information to the terminal by an access network device in a network. The request sending module is configured to send a random access request to the access network device by using a random access resource associated with the downlink beam. The information reporting module is configured to send identification information of the downlink beam selected during the random access procedure to the network.

Alternatively, the identification information of the downlink beam includes a SSB index corresponding to the downlink beam. The identification information of the downlink beam is sent to the network in response to an unsuccessfully completed the random access procedure. The random access procedure can be triggered and executed in any scenario of: a connection establishment scenario, a connection recovery scenario, a BFR scenario, an RLF scenario, and a connection reestablishment scenario.

The apparatus can further include a congestion recording module that is configured to record a congestion situation of the downlink beam selected during the random access procedure. The information reporting module is further configured to send the congestion situation to the network. The congestion recording module can be configured to record congestion indication information corresponding to identification information of an $i^{th}$ downlink beam, in which the congestion indication information is configured to indicate whether congestion exists in the $i^{th}$ downlink beam, where i is a positive integer. Alternatively, the congestion recording module is configured to record first information, the first information configured to indicate that all downlink beams selected by the terminal during the random access procedure are congested, or record second information, the second information configured to indicate that at least one downlink beam selected by the terminal during the random access procedure is uncongested.

Additionally, the apparatus can further include a quality recording module that is configured to record signal quality of at least one downlink beam for being selected by the terminal during the random access procedure, in which the at least one downlink beam is in a cell to which the terminal belongs. The information reporting module is further configured to send the recorded signal quality to the network. Alternatively, the quality recording module is configured to record the signal quality of the downlink beam selected during the random access procedure. A total number of downlink beams selected by the terminal during the random access procedure is n, and n is a positive integer. The quality recording module is configured to in response to determining that n is less than or equal to a preset threshold t, record signal quality of the n downlink beams, and in response to determining that n is greater than the preset threshold t, record signal quality of t downlink beams in the n downlink beams.

Alternatively, the quality recording module is further configured to, in response to determining that n is less than the preset threshold t, record signal quality of m downlink beams, in which the m downlink beams are first m downlink beams selected from downlink beams sorted based on signal quality in descending order, the downlink beams are not selected by the terminal during the random access procedure, and m is a positive integer.

Alternatively, the apparatus further can include a number recording module that is configured to record a number of times of transmitting a preamble corresponding to at least one downlink beam selected during the random access procedure. The information reporting module is further configured to send the recorded number of times of transmitting the preamble to the network.

According to a third aspect of the disclosure, a terminal is provided. The terminal includes a processor and a memory for storing instructions executable by the processor. The processor is configured to select a downlink beam during a random access procedure, in which the downlink beam is a beam configured to send information to the terminal by an access network device in a network, send a random access request to the access network device by using a random access resource associated with the downlink beam; and send identification information of the downlink beam selected during the random access procedure to the network.

According to a fourth aspect of the disclosure, a non-transitory computer-readable storage medium having computer instructions stored thereon is provided. When the instructions are executed by a processor, the method according to the first aspect of the present disclosure is implemented.

The technical solution provided in the embodiment of the present disclosure may include beneficial effects. For example, by reporting the identification information of the downlink beam selected during the random access procedure by the terminal to the network, it is determined whether the terminal selects all the downlink beams suitable for selection, which is helpful for the network to accurately locate causes of the terminal's problem during the random access procedure, so as to make a right solution.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
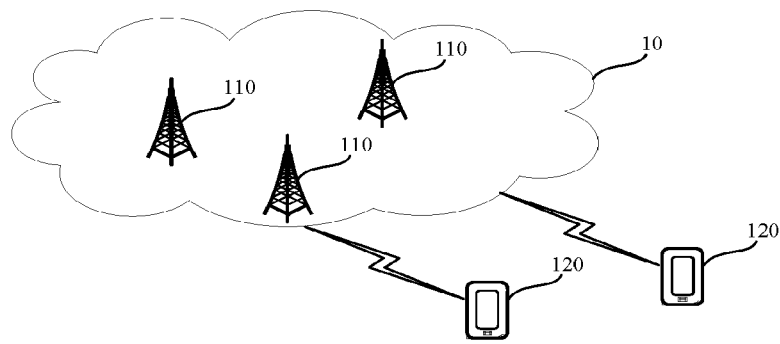
FIG. 1 is a schematic diagram of an application scenario according to an exemplary embodiment.

FIG. 1 is a schematic diagram of an application scenario according to an exemplary embodiment. The application scenario may include a plurality of access network devices 110 and terminals 120. Each access network device 110 is deployed in a radio access network (RAN) 10. Generally, there are multiple terminals 120, and one or more terminals 120 may be distributed in a cell managed by each access network device 110.

The access network device 110 and the terminal 120 communicate with each other through a certain air interface technology, for example, cellular technology. The technical solutions described in an embodiment of the present disclosure may be applied to a long term evolution (LTE) system, and may also be applied to subsequent evolution systems of the LTE system, such as a LTE-advanced (LTE-A) system, and a 5G system, also known as NR (New Radio) systems. In an embodiment of the present disclosure, the terms "network" and "system" are often used alternately, but those skilled in the art could understand their meanings.

The terminal in an embodiment of the present disclosure may include various handheld devices, vehicle-mounted devices, wearable devices, computing devices with wireless communication functions or other processing devices connected to a wireless modem, as well as various forms of user equipment (UE), mobile stations (MSs) and terminal devices. For ease of description, the devices mentioned above are collectively referred to as terminals.

The access network device in the RAN in an embodiment of the present disclosure may be a base station (BS), and the base station is a device deployed in the RAN to provide wireless communication functions for terminal. The base station may include various forms of macro base stations, micro base stations, relay stations and access points. In systems using different wireless access technologies, names of devices with base station functions may be different. For example, in an LTE system, the device is called evolved NodeB (eNB or eNodeB). In a 3G (3rd-generation) communication system, the device is called Node B. As communication technology evolves, the name "base station" may change. For ease of description, in an embodiment of the present disclosure, the above-mentioned devices that provide wireless communication functions for terminals are collectively referred to as the access network devices.

Figure 2:
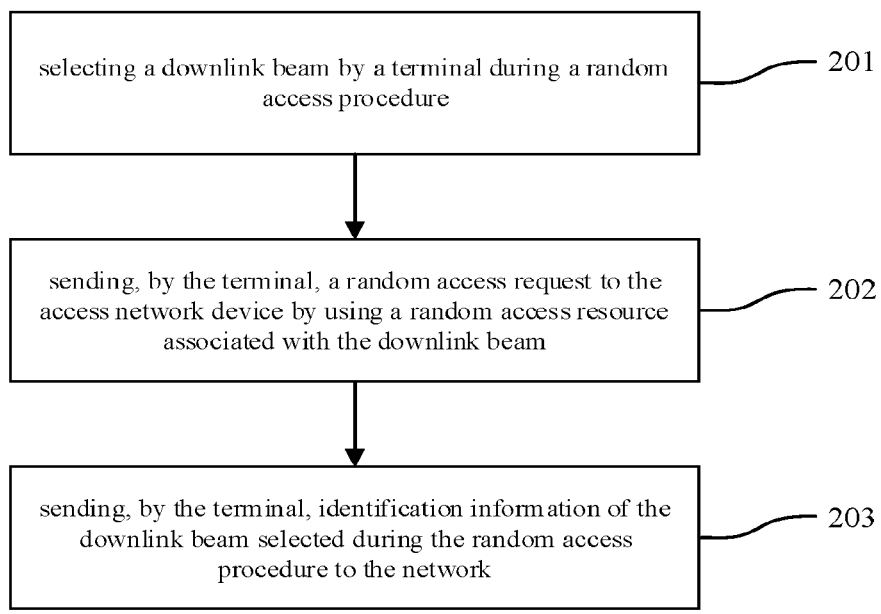
FIG. 2 is a flowchart of an information reporting method according to an exemplary embodiment.

FIG. 2 is a flowchart of an information reporting method according to an exemplary embodiment. This method may be applied to an application scenario illustrated in FIG. 1. The method may include the followings.

At block 201, a terminal selects a downlink beam during a random access procedure. The random access procedure is an inevitable procedure for establishing a wireless link between the terminal and an access network device. Only after the random access procedure is completed, normal data interaction operations between the terminal and the access network device may be performed. Alternatively, the purpose of performing the random access procedure includes but is not limited to any one of uplink synchronization, uplink data transmission, downlink data reception, beam failure recovery (BFR), handover, and a system information request (such as on-demand SI (system information) request). Alternatively, random access includes two modes, i.e., contention random access and non-contention random access.

In addition, the random access procedure is triggered and executed in any scenario of: a connection establishment scenario, a connection recovery scenario, a BFR scenario, a radio link failure (RLF) scenario, and a connection reestablishment scenario. When the terminal and the access network device are in a disconnected state, the random access procedure may be triggered in the connection establishment scenario, the connection recovery scenario or other scenarios. When the terminal and the access network device are in a connected state, the random access procedure may be triggered in the BFR scenario, the RLF scenario, the connection reestablishment scenario or other scenarios.

In the random access procedure, the terminal may select a downlink beam for the access network device. The downlink beam is a beam configured to send information to the terminal by the access network device. For example, the access network device uses the downlink beam selected by the terminal to send a response message in the random access procedure to the terminal. For example, after the success of the random access procedure, the access network device may use the downlink beam selected by the terminal to transmit downlink data or other system information to the terminal.

In an embodiment, a manner in which the terminal selects the downlink beam is not limited. For example, the terminal may select a downlink beam with good signal quality from downlink beams available for selection. In addition, the downlink beams available for selection by the terminal may be pre-configured before the random access procedure and provided to the terminal.

At block 202, the terminal sends a random access request to the access network device by using a random access resource associated with the downlink beam. The random access resource may include a time domain resource, a frequency domain resource, and a preamble. After selecting the downlink beam, the terminal uses the random access resource associated with the selected downlink beam to send the random access request to the access network device.

The random access request is a request sent by the terminal to the access network device during the random access procedure. The random access request is used to request establishing a wireless connection between the terminal and the access network device. Alternatively, the wireless connection is a radio resource control (RRC) connection. In addition, an association relation between the downlink beam and the random access resource may be pre-configured by the network and provided to the terminal.

At block 203, the terminal sends identification information of the downlink beam selected during the random access procedure to the network. During the random access procedure, the terminal may fail to receive a response message fed back by the access network device due to congestion of the downlink beam. In this case, the terminal may attempt to resend the random access request. Before resending the random access request to the access network device, the terminal may reselect a downlink beam, and use a random access resource associated with the reselected downlink beam to send the random access request to the access network device. Certainly, the terminal may still use the random access resource associated with the previously selected downlink beam to send the random access request to the access network device without reselecting a downlink beam. Therefore, during the random access procedure, the terminal may select one or more downlink beams.

The identification information of the downlink beam is used to uniquely identify the downlink beam, and different downlink beams correspond to different identification information. Alternatively, the identification information of the downlink beam includes a synchronization signal and physical broadcast channel block (SSB) index corresponding to the downlink beam, that is, an SSB index.

In an example embodiment, the terminal records and reports identification information of at least one downlink beam selected by the terminal during the random access procedure. For example, the terminal records identification information of a congested downlink beam from the selected downlink beams during the random access procedure.

In another example embodiment, the terminal records and reports identification information of all downlink beams selected by the terminal during the random access procedure. When the terminal records the identification information of all the downlink beams selected by the terminal during the random access procedure, the network may know which downlink beam is or which downlink beams are selected by the terminal after the terminal reports the identification information of all the downlink beams to the network. Then, it is determined whether the terminal selects all the downlink beams suitable for selection, which is helpful for the network to accurately locate causes of the problem of the terminal in the random access procedure, so as to make a correct solution.

In another exemplary embodiment, in a case of random access procedure unsuccessfully completed, the terminal records and reports the above identification information, and in a case of the random access procedure successfully completed, the terminal does not record the above identification information. In another example, the terminal records the identification information during both the case of the random access procedure unsuccessfully completed and successfully completed. In the case of the random access procedure unsuccessfully completed, the terminal records the above identification information, and reports the identification information to the network at appropriate time, so that the network may investigate problems accordingly.

In addition, in an embodiment of the present disclosure, a location where the identification information is recorded is not limited. Alternatively, when the random access procedure unsuccessfully completed in the connection establishment scenario or the connection recovery scenario, the terminal records the identification information in a first preset variable. For example, the first preset variable may be a VarConnEstFailReport variable. When the random access procedure unsuccessfully completed in the RLF scenario of a master cell group (MCG), the terminal records the identification information in a second preset variable. For example, the second preset variable may be a VarRLF-Report variable. When the random access procedure unsuccessfully completed in the RLF or BFR scenario of a secondary cell group (SCG), the terminal directly reports the identification information to the network through a system message. For example, the system message may be an SCG failure information message.

In addition, the terminal may determine whether the random access procedure is unsuccessfully completed by determining whether a timer expires. The timer may be triggered at the beginning of the random access procedure. For example, in the connection establishment scenario, a timer related to the connection establishment scenario is a T300 timer. When the T300 timer expires, the terminal determines that the random access procedure is unsuccessfully completed. When a timer associated with a connection recovery procedure expires, for example, a T319 timer expires, it is determined that the random access procedure is unsuccessfully completed.

In addition, after the random access procedure successfully completed, the terminal sends the recorded information, including the identification information of the downlink beam introduced above, to the network. Alternatively, after the random access procedure successfully completed, the terminal sends the recorded information to a currently accessed access network device. In an example embodiment, the terminal directly sends the recorded information to the network after the random access procedure successfully completed. In another example embodiment, the terminal sends the recorded information to the network after the random access procedure successfully completed and after obtaining a consent of the network. Alternatively, after the random access procedure successfully completed, the terminal sends an information report request to the network, and the information report request is used to request to send the information recorded by the terminal to the network. After receiving a confirmation instruction corresponding to the information report request, the terminal sends the recorded information to the network.

In conclusion, in the technical solution provided in the embodiments of the present disclosure, by reporting the identification information of the downlink beam selected by the terminal during the random access procedure to the network, it is determined whether the terminal selects all the downlink beams suitable for selection. Thus, it is helpful for the network to accurately locate the causes of the problem of the terminal during the random access procedure, so as to make a correct solution.

In an alternative embodiment provided based on the embodiment illustrated in FIG. 2, the terminal may also record and report a congestion situation of the downlink beam selected during the random access procedure, and the terminal sends the congestion situation to the network.

In the embodiments of the present disclosure, the congestion situation is used to indicate whether there is congestion in the downlink beam selected by the terminal. Alternatively, when the terminal does not receive a response message fed back by the access network device after the terminal uses the random access resource associated with the selected downlink beam to send the random access request to the access network device, the terminal determines that there is congestion in the selected downlink beam. Taking the contention random access as an example, when the terminal does not receive a contention resolution message from the access network device at the 4-step feedback, the terminal determines that there is congestion in the selected downlink beam, or, when the contention resolution message from the access network device at 4-step feedback indicates that a contention resolution is failed, the terminal determines that there is congestion in the selected downlink beam: or, when the terminal does not receive a random access response from the access network device at the 2-step feedback, the terminal determines that there is congestion in the selected downlink beam.

In a possible implementation, the terminal records and reports congestion situation of at least one downlink beam selected by the terminal during the random access procedure. In another possible implementation, the terminal records and reports all downlink beams which is in congestion situation selected by the terminal during the random access procedure. In another possible implementation, when the random access procedure unsuccessfully completed, the terminal records and reports the above congestion situation, and when the random access procedure successfully completed, the terminal does not record the above congestion situation. In another example, the terminal records the above congestion situation in response to both the cases of random access procedure unsuccessfully completed or successfully completed. In the case that the random access procedure unsuccessfully completed, the terminal records the above congestion situation, and reports the congestion situation to the network at appropriate time, so that the network investigates the problem accordingly.

In addition, in an embodiment of the present disclosure, a location where the congestion situation is recorded is not limited. The location for recording the congestion situation may be the same as or different from that for recording the above-mentioned identification information, which is not limited in the embodiments of the present disclosure.

After the random access procedure is successfully completed, the terminal may also report the recorded congestion situation of the downlink beam to the network. A method for reporting the congestion situation may be the same as the method for reporting the identification information introduced above. In addition, the congestion situation and the identification information may be reported at the same time or at different time, which is not limited in the embodiments of the present disclosure.

In conclusion, in the technical solution provided by an embodiment of the present disclosure, by reporting the congestion condition of the downlink beam selected by the terminal during the random access procedure to the network, it is convenient for the network to investigate the congestion problem of the downlink beam, improving network performance.

Several possible implementations for the terminal to record the congestion situation of the downlink beam are introduced and explained below.

In a possible implementation, the terminal records the identification information of the downlink beam selected during the random access procedure, and congestion indication information corresponding to identification information of an $i^{th}$ downlink beam, in which the congestion indication information is configured to indicate whether congestion exists in the $i^{th}$ downlink beam, and i is a positive integer.

Alternatively, the terminal records the congestion situation of the selected downlink beam in a following manner. The terminal records identification information of all the selected downlink beams and congestion indication information corresponding to each identification information. For example, refer to a following table-1:

TABLE 1

| Identification information of downlink beams | Congestion indication information |
|---|---|
| SSB index1 | 1 |
| SSB index2 | 1 |
| SSB index3 | 1 |
| SSB index4 | 1 |
| SSB index5 | 0 |

In the above table-1, the congestion indication information of the downlink beam is represented by 1 or 0, where 1 means that there is congestion, and 0 means that there is no congestion.

In addition, in other embodiments, the terminal may record corresponding congestion indication information for indicating congestion according to identification information of congested downlink beam from all the selected downlink beams, and/or, the terminal may record corresponding congestion indication information for indicating that there is no congestion according to the identification information of uncongested downlink beam from all the selected downlink beams. Alternatively, the terminal may also only record congestion indication information corresponding to identification information of the selected part of the downlink beams.

Alternatively, the congestion indication information may be represented by 1 bit. For example, 1 means that there is congestion, and 0 means that there is no congestion. Alternatively, 0 means that there is congestion, and 1 means that there is no congestion.

In another possible implementation, the terminal may record the congestion situation of the downlink beam selected during the random access procedure by followings.

The terminal records first information. The first information is configured to indicate that the downlink beam selected by the terminal during the random access procedure is congested. Alternatively, the terminal records second information. The second information is configured to indicate that at least one downlink beam selected by the terminal during the random access procedure is uncongested. The first information and the second information may also be represented by 1 bit. For example, the first information is 1 and the second information is 0. Alternatively, the first information is 0) and the second information is 1.

In conclusion, the embodiments of the present disclosure provide the above two ways of recording congestion situation. In the first way, by recording the congestion indication information corresponding to the identification information of the downlink beam, the congestion situation of a certain downlink beam or some downlink beams are determined, so that the network is enabled to accurately learn the congestion situation of the downlink beam selected by the terminal in the random access procedure, so as to accurately locate the cause of the problem of the terminal during the random access procedure. In the second way, the first information or the second information is recorded to indicate the congestion situation, and the amount of recorded information is small, which helps to reduce traffic overhead when reporting.

In another alternative embodiment provided based on the embodiment illustrated in FIG. 2 or the above alternative embodiments, the terminal may further record and report following information. The terminal records signal quality of at least one downlink beam for being selected by the terminal during the random access procedure, in which the at least one downlink beam is in a cell to which the terminal belongs, and the terminal sends the recorded signal quality to the network.

Signal quality is one of the parameters representing strength of wireless signals in the network, and is used to measure signal strength of a downlink beam. Alternatively, the signal quality includes reference signal received power (RSRP).

Alternatively, recording the signal quality of the at least one downlink beam for being selected by the terminal during the random access procedure includes: recording, by the terminal, the signal quality of the downlink beam selected during the random access procedure. In an embodiment, the terminal records signal quality of at least one downlink beam selected during the random access procedure. In another embodiment, the terminal records signal quality of all downlink beams selected during the random access procedure. When the terminal records the signal quality of all the downlink beams selected by the terminal during the random access procedure, the network may learn the signal quality of all the downlink beams selected during the random access procedure after the terminal reports the information to the network, which is convenient for the network to understand signal quality problems of the cell, improving the network performance.

Alternatively, the terminal may record the signal quality of the selected downlink beam in any of the following ways: recording according to a sequential order of selecting downlink beams for transmitting respective preambles during the random access procedure: and recording according to a descending order of the signal quality of the downlink beams.

Alternatively, there is a limit to the number of signal quality that can be recorded by the terminal. For example, there is an upper limit to the number, and the upper limit is a preset threshold t. The preset threshold t may be configured by the network, specified by protocols, or configured by the terminal.

For example, a total number of downlink beams selected by the terminal during the random access procedure is n, where n is a positive integer. When n is less than or equal to the preset threshold t, the terminal records signal quality of the n downlink beams. When n is greater than the preset threshold t, the terminal records signal quality of t downlink beams in the n downlink beams.

Alternatively, recording the signal quality of t downlink beams in the n downlink beams includes any one of: recording signal quality of the first t downlink beams in the n downlink beams: recording signal quality of the last t downlink beams in the n downlink beams; recording signal quality of the middle k downlink beams in the n downlink beams: and recording signal quality of any t downlink beams in the n downlink beams. In addition, t may be the same as or different from the above k.

Alternatively, in response to determining that n is less than the preset threshold t, the terminal records signal quality of m downlink beams, in which the m downlink beams are first m downlink beams selected from downlink beams sorted based on signal quality in descending order, the downlink beams are not selected by the terminal during the random access procedure, and m is a positive integer. Alternatively, the value of m is t-n.

In addition, when there is no upper limit to the number of signal qualities that the terminal can record, the terminal may record the signal quality of all downlink beams in the cell to which the terminal belongs.

After the random access procedure is successfully completed, the terminal may also report the recorded signal quality of the downlink beam to the network. A method for reporting the signal quality may be the same as the method for reporting the identification information introduced above. In addition, the identification information, the congestion condition, and the signal quality may be reported at the same time or at different time, which is not limited in the embodiments of the present disclosure.

In conclusion, in the technical solution provided by the embodiments of the present disclosure, the terminal reports the signal quality of at least one downlink beam for the terminal to select in the random access procedure to the network, the at least one downlink beam is within the cell to which the terminal belongs, so that the network learns the signal quality of the downlink beams in the cell.

In another example, in addition to recording and reporting the identification information, the congestion situation and the signal quality of the selected downlink beam described above, the terminal may also record and report the number of times of transmitting preambles on the at least one selected downlink beam. For example, for each downlink beam selected by the terminal in the random access procedure, the terminal separately records the number of times of transmitting preambles corresponding to each downlink beam. The terminal sends the recorded number of times of transmitting preambles to the network. The number of times of transmitting preambles corresponding to a certain downlink beam refers to the number of times of transmitting preambles using a random access resource associated with the certain downlink beam. Similarly, the terminal may also report the recorded number of times of transmitting preambles to the network after the random access procedure is successfully completed. A method for reporting the number of times of transmitting preambles may be the same as the reporting method described above. In addition, the identification information, the congestion condition, the signal quality, and the number of times of transmitting preambles may be reported at the same time or at different time, which is not limited in the embodiments of the present disclosure. When the recorded number of times of transmitting preambles is reported to the network at appropriate time, the network may learn the behaviors of the terminal during the random access procedure, for example, whether the terminal selects a downlink beam to initiate a random access procedure.

The followings are apparatus embodiments of the present disclosure, which is used to implement the method embodiments of the present disclosure. For details that are not disclosed in the apparatus embodiments of the present disclosure, the method embodiments of the present disclosure may be referred to.

Figure 3:
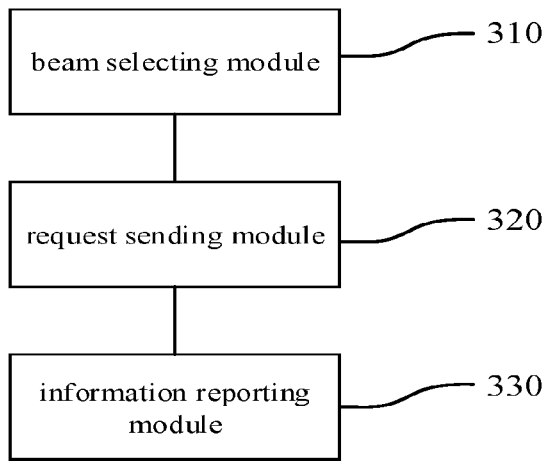
FIG. 3 is a block diagram of an information reporting apparatus according to an exemplary embodiment.

FIG. 3 is a block diagram of an information reporting apparatus according to an exemplary embodiment. The apparatus has the functions of realizing the above method, and the functions may be realized by hardware, or by software executed by hardware. The apparatus may be applied to a terminal. The apparatus may include a beam selecting module 310, a request sending module 320, and an information reporting module 330. Again, of course it should be understood that one or more of the modules described in this specification can be implemented by hardware, such as circuitry.

The beam selecting module 310 is configured to select a downlink beam during a random access procedure, in which the downlink beam is a beam configured to send information to the terminal by an access network device in a network. The request sending module 320 is configured to send a random access request to the access network device by using a random access resource associated with the downlink beam. The information reporting module 330 is configured to send identification information of the downlink beam selected during the random access procedure to the network.

In conclusion, in the technical solution provided by the embodiments of the present disclosure, by reporting the identification information of the downlink beam selected by the terminal during the random access procedure to the network, it is determined whether the terminal selects all the downlink beams suitable for selection, which is helpful for the network to accurately locate the causes of the problem of the terminal during the random access procedure, so as to make the correct solution.

In an alternative embodiment provided based on the embodiment illustrated in FIG. 3, the identification information of the downlink beam includes an SSB index corresponding to the downlink beam.

In another alternative embodiment provided based on the embodiment illustrated in FIG. 3 or the above-mentioned alternative embodiment, the identification information of the downlink beam is sent to the network in response to an unsuccessfully completed random access procedure.

In another alternative embodiment provided based on the embodiment illustrated in FIG. 3 or the above-mentioned alternative embodiment, the random access procedure is triggered and executed in any scenario of: a connection establishment scenario, a connection recovery scenario, a BFR scenario, an RLF scenario, and a connection reestablishment scenario.

In another alternative embodiment provided based on the embodiment in FIG. 3 or the above-mentioned alternative embodiment, the apparatus further includes a congestion recording module (not shown in the figures). The congestion recording module is configured to record a congestion situation of the downlink beam selected during the random access procedure. The information reporting module 330 is further configured to send the congestion situation to the network. In an example embodiment, the congestion recording module is configured to record congestion indication information corresponding to identification information of an $i^{th}$ downlink beam, in which the congestion indication information is configured to indicate whether congestion exists in the $i^{th}$ downlink beam, where i is a positive integer.

In another example embodiment, the congestion recording module is configured to record first information, the first information configured to indicate that all downlink beams selected by the terminal during the random access procedure are congested, or record second information, the second information configured to indicate that at least one downlink beam selected by the terminal during the random access procedure is uncongested.

In another alternative embodiment provided based on the embodiment in FIG. 3 or the above-mentioned alternative embodiment, the apparatus further includes a quality recording module (not shown). The quality recording module is configured to record signal quality of at least one downlink beam for being selected by the terminal during the random access procedure, in which the at least one downlink beam is in a cell to which the terminal belongs. The information reporting module 330 is further configured to send the recorded signal quality to the network. Alternatively, the quality recording module is configured to record the signal quality of the downlink beam selected during the random access procedure. Alternatively, a total number of downlink beams selected by the terminal during the random access procedure is n, and n is a positive integer.

The quality recording module is configured to: in response to determining that n is less than or equal to a preset threshold t, record signal quality of the n downlink beams: and in response to determining that n is greater than the preset threshold t, record signal quality of t downlink beams in the n downlink beams.

Alternatively, the quality recording module is further configured to, in response to determining that n is less than the preset threshold t, record signal quality of m downlink beams, in which the m downlink beams are first m downlink beams selected from downlink beams sorted based on signal quality in descending order, the downlink beams are not selected by the terminal during the random access procedure, and m is a positive integer.

In another alternative embodiment provided based on the embodiment in FIG. 3 or the above-mentioned alternative embodiment, the apparatus further includes a number recording module (not shown in the Figures). The number recording module is configured to record a number of times of transmitting a preamble corresponding to at least one downlink beam selected during the random access procedure.

The information reporting module 330 is further configured to send the recorded number of times of transmitting the preamble to the network.

It should be noted that, when the apparatus provided in the above embodiments realizes the functions, only the division of the above functional modules is used for illustration. In actual applications, the above functions are allocated by different functional modules according to actual needs. That is, content structure of the apparatus is divided into different functional modules to complete all or part of the functions described above.

Regarding the apparatus in the foregoing embodiments, the specific manner in which each module performs operations has been described in detail in the method embodiments, and detailed description will not be given here.

In an example embodiment, a terminal is provided to implement the information reporting method. The terminal includes a processor and a memory for storing instructions executable by the processor. The processor is configured to select a downlink beam during a random access procedure, in which the downlink beam is a beam configured to send information to the terminal by an access network device in a network, send a random access request to the access network device by using a random access resource associated with the downlink beam, and send identification information of the downlink beam selected during the random access procedure to the network.

Alternatively, the identification information of the downlink beam includes a SSB index corresponding to the downlink beam. Further, the identification information of the downlink beam can sent to the network in response to an unsuccessfully completed random access procedure. The random access procedure can be triggered and executed in any scenario of: a connection establishment scenario, a connection recovery scenario, a beam failure recovery (BFR) scenario, a radio link failure (RLF) scenario, and a connection reestablishment scenario.

Alternatively, the processor is configured to record a congestion situation of the downlink beam selected during the random access procedure and send the congestion situation to the network.

Alternatively, the processor can be configured to record congestion indication information corresponding to identification information of an $i^{th}$ downlink beam, in which the congestion indication information is configured to indicate whether congestion exists in the $i^{th}$ downlink beam, and i is a positive integer. The processor can further be configured to record first information, the first information configured to indicate that all downlink beams selected by the terminal during the random access procedure are congested, or record second information, the second information configured to indicate that at least one downlink beam selected by the terminal during the random access procedure is uncongested.

Alternatively, the processor is further configured to record signal quality of at least one downlink beam for being selected by the terminal during the random access procedure, in which the at least one downlink beam is in a cell to which the terminal belongs and send the recorded signal quality to the network. The processor can further be configured to record the signal quality of the downlink beam selected during the random access procedure.

Alternatively, a total number of downlink beams selected by the terminal during the random access procedure is n, where n is a positive integer.

The processor is further configured to, in response to determining that n is less than or equal to a preset threshold t, record signal quality of the n downlink beams, and, in response to determining that n is greater than the preset threshold t, record signal quality of t downlink beams in the n downlink beams. The processor is configured to, in response to determining that n is less than the preset threshold t, record signal quality of m downlink beams, in which the m downlink beams are first m downlink beams selected from downlink beams sorted based on signal quality in descending order, the downlink beams are not selected by the terminal during the random access procedure, and m is a positive integer.

Alternatively, the processor is further configured to record a number of times of transmitting a preamble corresponding to at least one downlink beam selected during the random access procedure, and send the recorded number of times of transmitting the preamble to the network.

The above mainly introduces the solutions provided by the embodiments of the present disclosure from the terminal side. It is understood that, in order to realize the above-mentioned functions, the terminal includes hardware structures and/or software modules corresponding to each function. In combination with the units and algorithm steps of the examples disclosed in the embodiments of the present disclosure, the embodiments of the present disclosure are implemented in the form of hardware or a combination of hardware and computer software. Whether a function is executed by hardware or computer software-driven hardware depends on the specific application and design constraints of the technical solution. Those skilled in the art may use different methods for each specific application to implement the described functions, but such implementation should not be considered as going beyond the scope of the technical solution of the embodiments of the present disclosure.

Figure 4:
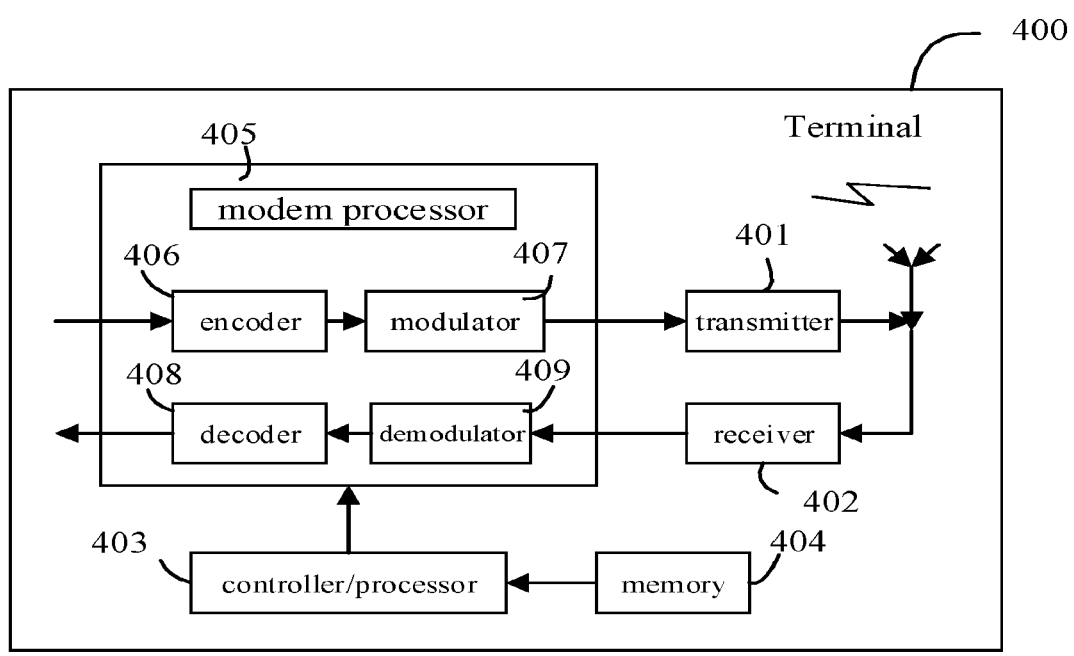
FIG. 4 is a schematic diagram of a terminal according to an exemplary embodiment.

FIG. 4 is a schematic diagram of a terminal 400 according to an exemplary embodiment. The terminal 400 includes a transmitter 401, a receiver 402 and a processor 403. The processor 403 may also be a controller, which is represented as "controller/processor 403" in FIG. 4. Alternatively, the terminal 400 may further include a modem processor 405, where the modem processor 405 may include an encoder 406, a modulator 407, a decoder 408, and a demodulator 409.

In an example, the transmitter 401 adjusts output samples and generates uplink signals, such as performing analog conversion, filtering, amplification, and up-conversion. The uplink signals are transmitted to the access network device via an antenna. On a downlink, the antenna receives downlink signals transmitted by the access network device. The receiver 402 adjusts the signals received from the antenna and provides input samples, such as performing filtering, amplification, down-conversion, and digitization. In the modem processor 405, the encoder 406 receives service data and signaling messages to be transmitted on the uplink, and processes the service data and signaling messages, such as performing formatting, encoding, and interleaving.

The modulator 407 further processes (e.g., performs symbol mapping and modulation) the encoded service data and signaling messages and provides the output samples. The demodulator 409 processes (e.g., demodulates) the input samples and provides symbol estimations. The decoder 408 processes (e.g., de-interleaves and decodes) the symbol estimations and provides decoded data and signaling messages sent to the terminal 400. The encoder 406, the modulator 407, the demodulator 409 and the decoder 408 may be implemented by a synthesized modem processor 405. These units are processed according to wireless access technologies (for example, access technologies of LTE and other evolved systems) adopted by the wireless access network. It should be noted that when the terminal 400 does not include the modem processor 405, the foregoing functions of the modem processor 405 may also be performed by the processor 403.

The processor 403 controls and manages actions of the terminal 400, and is used to execute the processing process performed by the terminal 400 in the foregoing embodiments of the present disclosure. For example, the processor 403 is further configured to execute various steps on the terminal side in the foregoing method embodiments, and/or other steps of the technical solution described in the embodiments of the present disclosure. Further, the terminal 400 may further include a memory 404, and the memory 404 is configured to store program codes and data for the terminal 400.

The processor used to perform the functions of the above-mentioned terminal in the embodiments of the present disclosure may be a Central Processing Unit (CPU), a general-purpose processor, a Digital Signal Processor (DSP), and an Application-Specific Integrated Circuit (ASIC), and Field Programmable Gate Array (FPGA) or other programmable logic devices, transistor logic devices, hardware components or any combination thereof. The processor can implement or execute various exemplary logical blocks, modules and circuits described in combination with the present disclosure of the embodiments of the present disclosure. The processor may also be a combination of computing functions, for example, a combination of one or more microprocessors, and a combination of a DSP and a microprocessor.

The steps of the method or algorithm described in combination with the present disclosure of the embodiments of the present disclosure may be implemented by hardware, or by executing software instructions through the processor. Software instructions are composed of corresponding software modules. The software modules are stored in Random Access Memory (RAM), flash memory, Read Only Memory (ROM), and Erasable Programmable ROM (EPROM), Electrically EPROM (EEPROM), registers, hard disk, portable hard disk, CD-ROM or any other form of storage mediums known in the art. An exemplary storage medium is coupled to the processor, so that the processor can read information from the storage medium and write information to the storage medium. Certainly, the storage medium may also be a component of the processor. The processor and the storage medium may be located in the ASIC. In addition, the ASIC may be located in the terminal. Certainly, the processor and the storage medium may also exist in the terminal as discrete components.

Those skilled in the art should be aware that, in one or more of the foregoing examples, the functions described in the embodiments of the present disclosure may be implemented by hardware, software, firmware, or any combination thereof. When implemented by software, these functions are stored in a computer-readable medium or transmitted as one or more instructions or codes on a non-transitory computer-readable medium. Computer readable medium includes computer storage medium and communication medium, where the communication medium includes any media that facilitates the transfer of computer programs from one place to another. The storage medium may be any available medium that can be accessed by a general-purpose or special-purpose computer.

The embodiments of the present disclosure also provide a non-transitory computer-readable storage medium on which a computer program is stored, and when the computer program is executed by a processor, the steps of the above-mentioned information reporting method are realized.

It is understood that in the present disclosure, "plurality" refers to two or more, and other quantifiers are similar. In addition, it is noted that "and/or" in the text only describes a relation of the related objects and indicates three relations, for example, "A and/or B" indicates three conditions, i.e., A exists alone, A and B exist simultaneously, and B exists alone. The character "/" generally indicates that it is either the former related object or the latter related object.

The present disclosure is intended to cover any variations, uses, or adaptive changes that follow the general principles of the present disclosure and include common general knowledge or customary technical means in the technical field not disclosed in the present disclosure. The description and examples are to be considered exemplary only, and the true scope and spirit of the present disclosure are disclosed by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. An information reporting method, comprising:
   selecting a downlink beam by a terminal during a random access procedure, the downlink beam being a beam that is configured to send information to the terminal by an access network device in a network;
   sending, by the terminal, a random access request to the access network device by using a random access resource associated with the downlink beam;
   storing, by the terminal, identification information of the downlink beam selected during the random access procedure in a VarRLF-Report variable and a number of times of transmitting a preamble corresponding to at least one downlink beam selected during the random access procedure;
   recording, by the terminal, respective congestion indication information corresponding to identification information of each downlink beam selected during the random access procedure, wherein each congestion indication information is 1 bit for indicating whether a congestion occurs on the downlink beam; and
   sending, by the terminal, the identification information stored in the VarRLF-Report variable, the number of times of transmitting the preamble, and the congestion indication information to the network,
   wherein the identification information of the downlink beam further comprises a synchronization signal and physical broadcast channel block (SSB) index corresponding to the downlink beam.

2. The method according to claim 1, wherein the identification information of the downlink beam is sent to the network in response to an unsuccessfully completed random access procedure.

3. The method according to claim 1, wherein the random access procedure is triggered and executed in any scenario of: a connection establishment scenario, a connection recovery scenario, a beam failure recovery (BFR) scenario, a radio link failure (RLF) scenario, and a connection reestablishment scenario.

4. The method according to claim 1, wherein recording the congestion situation of the downlink beam selected during the random access procedure further comprises: recording first information that is configured to indicate that all downlink beams selected by the terminal during the random access procedure are congested; or recording second information that is configured to indicate that at least one downlink beam selected by the terminal during the random access procedure is uncongested.

5. The method according to claim 1, further comprising:
   recording, by the terminal, signal quality of at least one downlink beam for being selected by the terminal during the random access procedure, wherein the at least one downlink beam is in a cell to which the terminal belongs; and
   sending, by the terminal, the recorded signal quality to the network.

6. The method according to claim 5, wherein recording the signal quality of the at least one downlink beam for being selected by the terminal during the random access procedure further comprises:
   recording the signal quality of the downlink beam selected during the random access procedure.

7. The method according to claim 5, wherein:
   a total number of downlink beams selected by the terminal during the random access procedure is n, where n is a positive integer, and
   recording the signal quality of the at least one downlink beam provided for the terminal to select during the random access procedure further comprises:
   recording signal quality of the n downlink beams when n is less than or equal to a preset threshold; and
   recording signal quality of t downlink beams in the n downlink beams when n is greater than the preset threshold.

8. The method according to claim 7, further comprising:
   recording, by the terminal, signal quality of m downlink beams when n is less than the preset threshold t, where the m downlink beams are first m downlink beams selected from downlink beams sorted based on signal quality in descending order, the downlink beams are not selected by the terminal during the random access procedure, and m is a positive integer.

9. The method according to claim 7, wherein the identification information of the downlink beam includes a SSB index corresponding to the downlink beam.

10. A terminal, comprising:
    a processor; and
    a memory for storing instructions executable by the processor;
    wherein the processor is configured to:
    select a downlink beam during a random access procedure, the downlink beam being a beam configured to send information to the terminal by an access network device in a network;
    send a random access request to the access network device by using a random access resource associated with the downlink beam;
    store identification information of the downlink beam selected during the random access procedure in a VarRLF-Report variable and a number of times of transmitting a preamble corresponding to at least one downlink beam selected during the random access procedure;
    record respective congestion indication information corresponding to identification information of each downlink beam selected during the random access procedure, wherein each congestion indication information is 1 bit for indicating whether a congestion occurs on the downlink beam; and
    send the identification information stored in the VarRLF-Report variable, the number of times of transmitting the preamble and the congestion indication information to the network,
    wherein the identification information of the downlink beam further comprises a synchronization signal and physical broadcast channel block (SSB) index corresponding to the downlink beam.

11. The terminal according to claim 10, wherein the identification information of the downlink beam is sent to the network in response to an unsuccessfully completed random access procedure.

12. The terminal according to claim 10, wherein the random access procedure is triggered and executed in any scenario of: a connection establishment scenario, a connection recovery scenario, a beam failure recovery (BFR) scenario, a radio link failure (RLF) scenario, and a connection reestablishment scenario.

13. The terminal according to claim 10, wherein the processor is configured to record the congestion situation of the downlink beam selected during the random access procedure by:
recording first information that is configured to indicate that all downlink beams selected by the terminal during the random access procedure are congested; or recording second information that is configured to indicate that at least one downlink beam selected by the terminal during the random access procedure is uncongested.

14. A non-transitory computer-readable storage medium with computer programs stored thereon that, when executed by a processor, cause the processor to implement an information reporting method comprising:
selecting a downlink beam by a terminal during a random access procedure, the downlink beam being a beam configured to send information to the terminal by an access network device in a network;
sending, by the terminal, a random access request to the access network device by using a random access resource associated with the downlink beam;
storing identification information of the downlink beam selected during the random access procedure in a VarRLF-Report variable and a number of times of transmitting a preamble corresponding to at least one downlink beam selected during the random access procedure;
recording, by the terminal, respective congestion indication information corresponding to identification information of each downlink beam selected during the random access procedure, wherein each congestion indication information is 1 bit for indicating whether a congestion occurs on the downlink beam; and
sending, by the terminal, the identification information stored in the VarRLF-Report variable, the number of times of transmitting the preamble, and the congestion indication information to the network,
wherein the identification information of the downlink beam further comprises a synchronization signal and physical broadcast channel block (SSB) index corresponding to the downlink beam.

* * * * *